United States Patent [19]
Harris et al.

[11] Patent Number: 5,333,416
[45] Date of Patent: Aug. 2, 1994

[54] MODULAR WALL-FORMING, SHROUD-ENCLOSING PANEL FOR MOUNTING INTO THE INTERIOR OF AIRCRAFT

[75] Inventors: Edward D. Harris, Converse; Fred J. Schimmelpfennig, Jr., San Antonio; James F. Badgett, San Antonio; Jeffrey O. Bonner, San Antonio, all of Tex.

[73] Assignee: Pat Pyka Design Consultants, Inc., San Antonio, Tex.

[21] Appl. No.: 819,487

[22] Filed: Jan. 10, 1992

[51] Int. Cl.⁵ .................................. E04F 19/00
[52] U.S. Cl. .................................. 52/27; 312/7.2
[58] Field of Search ............... 52/207, 204, 36, 27; 244/18.2, 18.5, 19; 49/279; 312/7.2, 242, 248

[56] References Cited

U.S. PATENT DOCUMENTS

| | | | |
|---|---|---|---|
| 3,370,813 | 2/1968 | Albertine et al. | 244/118.5 |
| 3,567,842 | 3/1971 | Meyer | 52/27 X |
| 4,942,805 | 7/1990 | Hellwig et al. | 52/27 X |
| 5,009,042 | 4/1991 | Sacco et al. | 52/36 |
| 5,044,578 | 9/1991 | White et al. | 244/118.5 X |
| 5,054,239 | 10/1991 | Tucker et al. | 49/279 |
| 5,096,272 | 3/1992 | Portman | 312/7.2 |
| 5,148,282 | 9/1992 | Sedighzadeh | 312/7.2 X |

*Primary Examiner*—Carl D. Friedman
*Assistant Examiner*—Creighton Smith
*Attorney, Agent, or Firm*—Gunn, Lee & Miller

[57] ABSTRACT

A wall-forming panel (10) for insertion into the interior of an aircraft, the panel having a frame (12) with an outer surface (14) defining a cavity. A shroud (42) is dimensioned to fit within the cavity (44) and movable on an axle (84) between an opened position and a closed position, the closed position substantially enclosing the shroud (42) within the walls of the frame (12). A latch means (86) positively but releasably retains the shroud (42) in a closed or an opened position. The latch means (86) is comprised of a cam (144) and a cam release mechanism (172). The shroud (42) is dimensioned to receive a monitor (82) such as a small television screen, therein, and is powered by an electric motor drive (122).

19 Claims, 9 Drawing Sheets

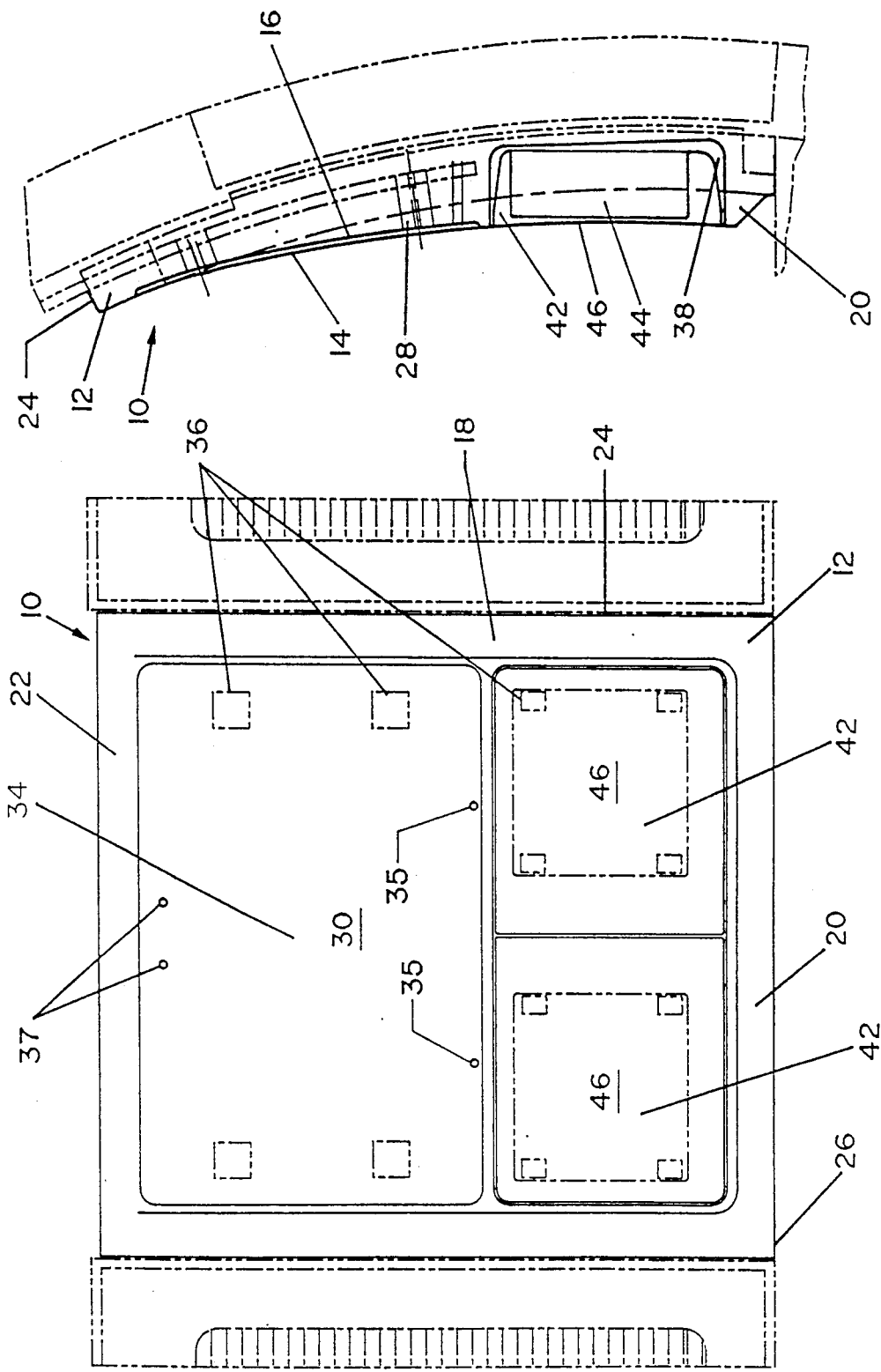

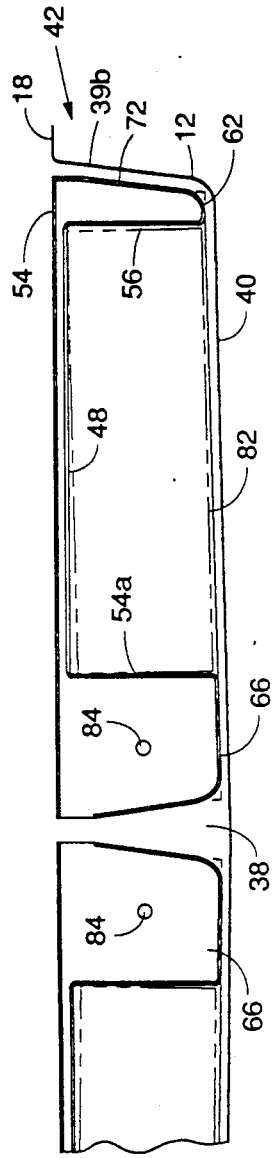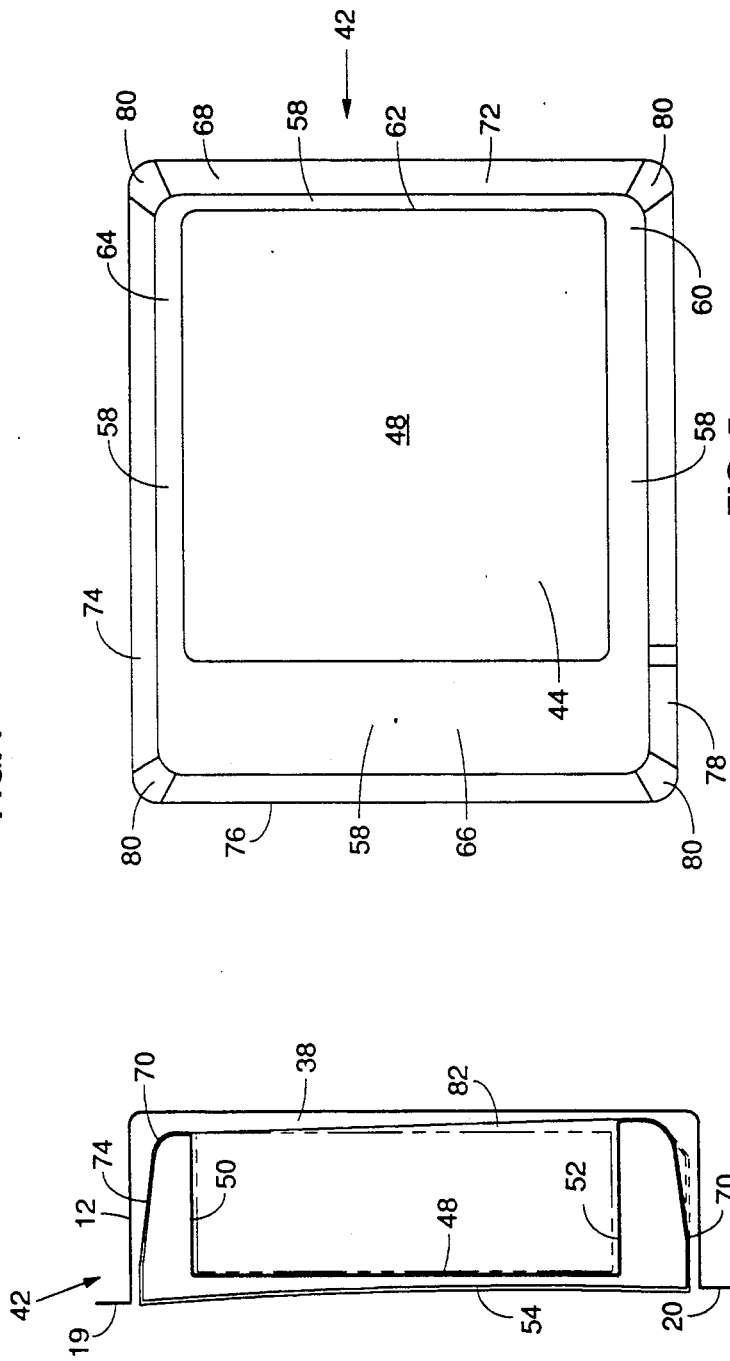

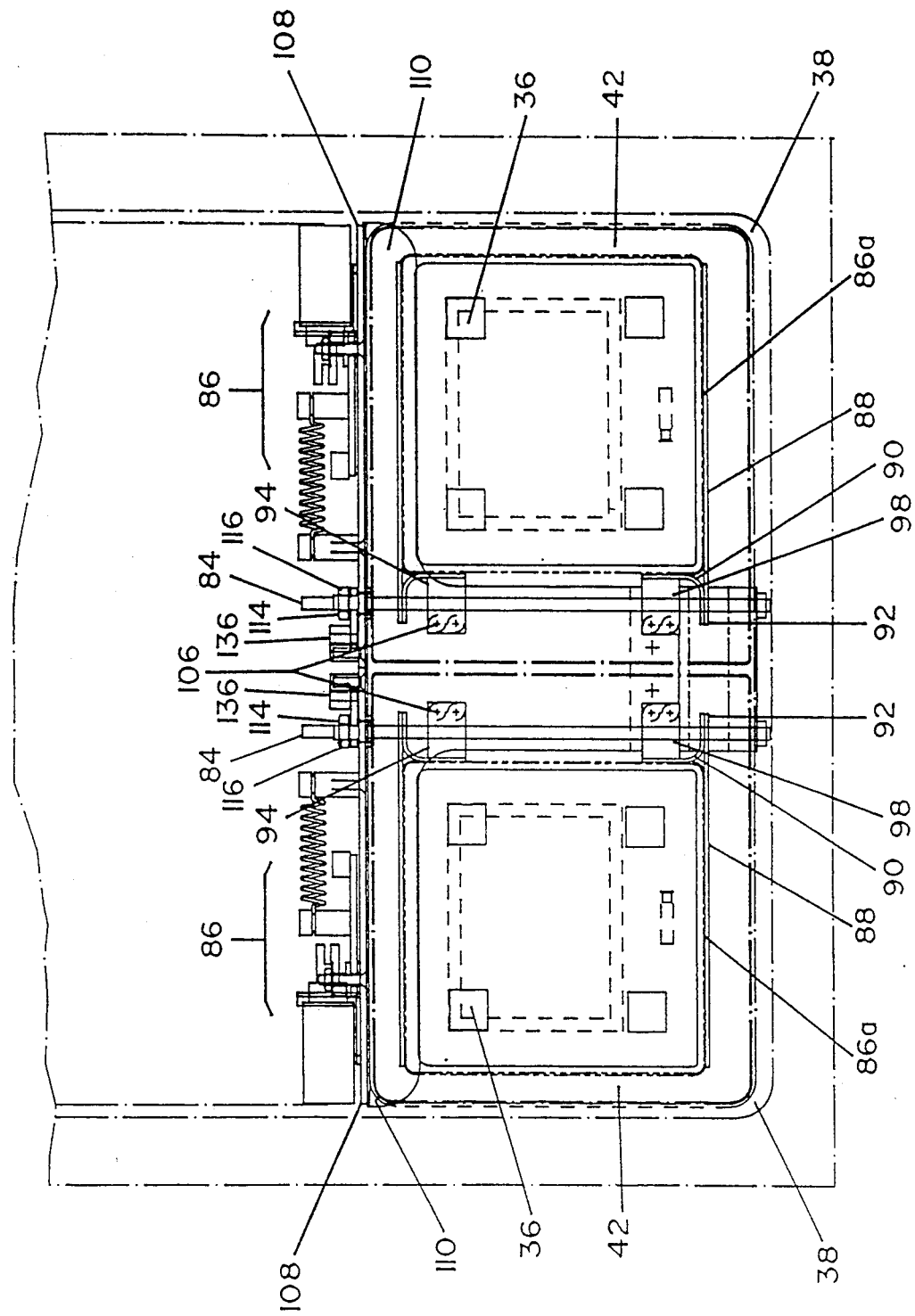

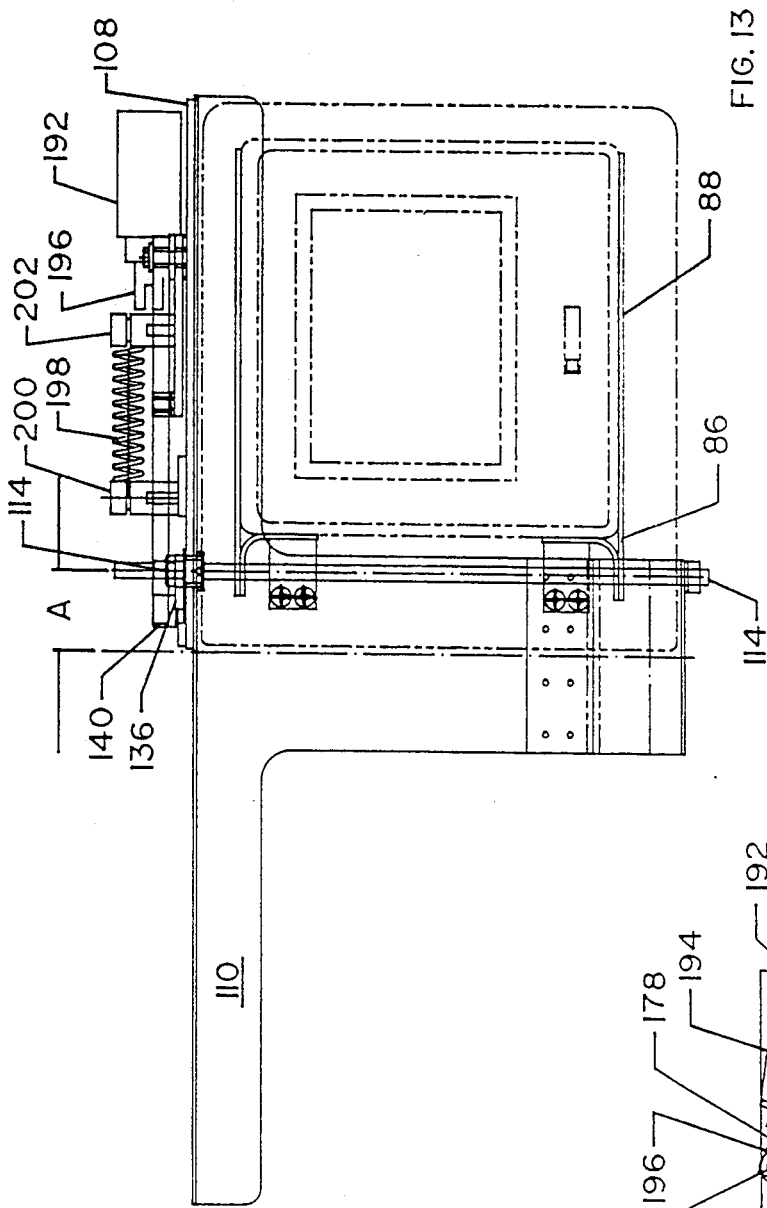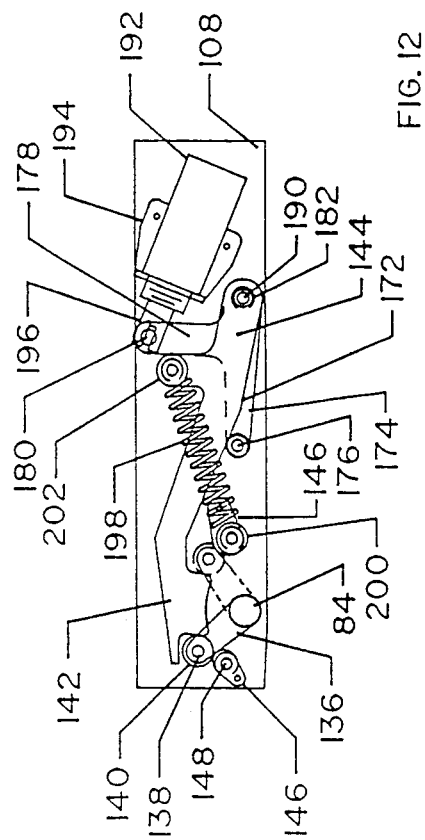

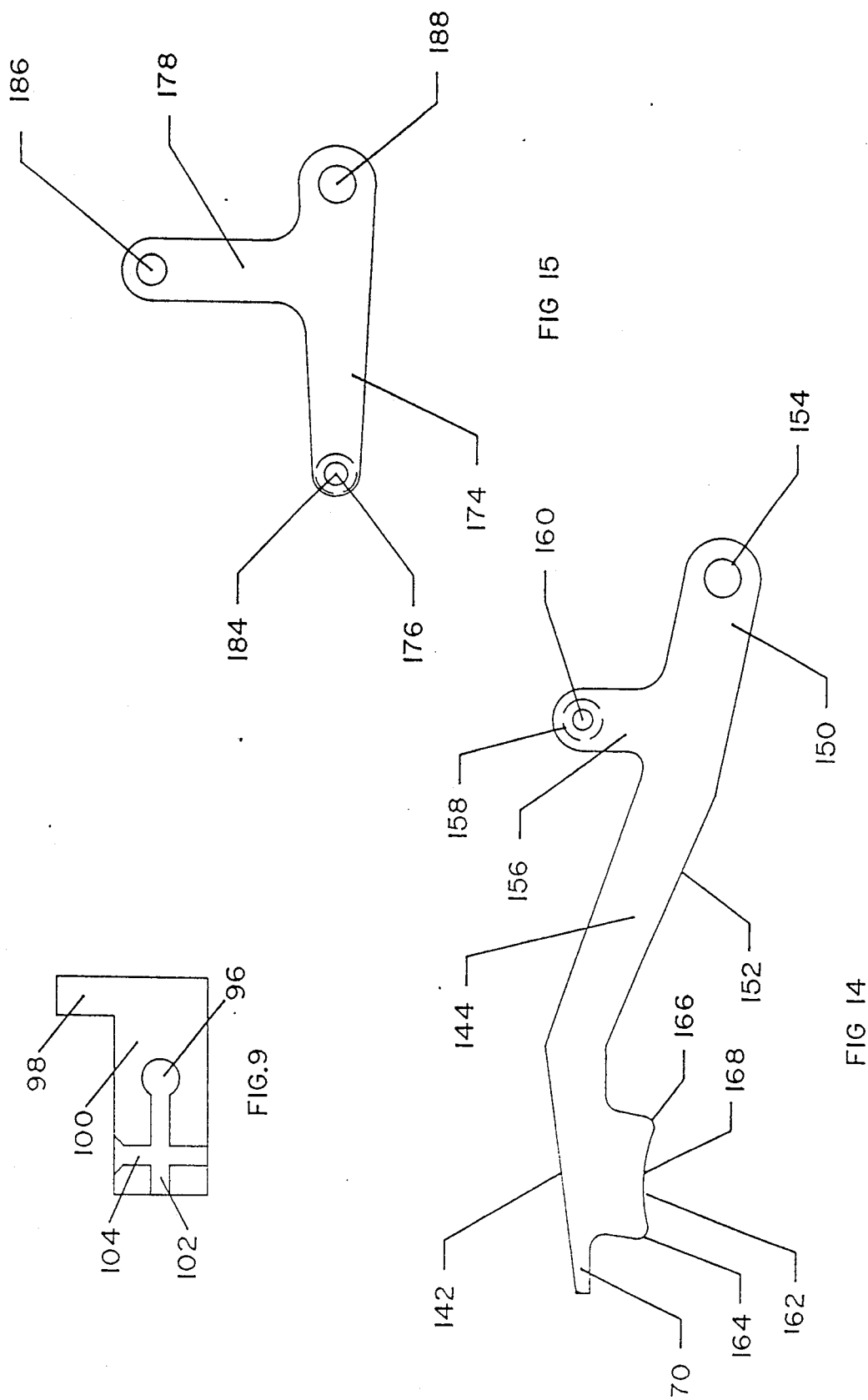

MODULAR WALL-FORMING, SHROUD-ENCLOSING PANEL FOR MOUNTING INTO THE INTERIOR OF AIRCRAFT

FIELD OF THE INVENTION

The invention relates to modular wall-forming panels having a compartment therein, the compartment for receiving flush-mounted shrouds which hold monitors, such as television screens. More specifically, the present invention relates to a unique panel having a compartment capable of enclosing a shroud therein, the shroud having a unique latch mechanism capable of positively retaining the shroud in a closed or an opened position.

BACKGROUND

Corporate aircraft such as those manufactured by Boeing, Canadair, Falcon, Gulfstream, Lockheed, and McDonald-Douglas often have custom-finished interiors. These interiors sometimes include all of the amenities of a home—such as showers, kitchens, and the like. However, because of the limited space within the aircraft interior, unique designs must be provided to overcome the problems associated with the limitations and space and weight. Lightweight, compact devices are necessary.

The device of the present invention provides for storing within the aircraft interior side wall panel, an LCD monitor storage system which opens and closes at the touch of a button. The monitor storage system provides a shroud which is lightweight and compact and fits within a panel-insertable frame which blends flush into the side wall of the aircraft interior.

Presently, LCD monitors or small televisions are stored in conventional door-accessible cabinets built into bulkheads or side walls of the aircraft interior. The user opens the cabinet door and extends the monitor which is mounted on a conventional, pivoting, adjustable extension arm.

Applicant, on the other hand, provides in the device of the present invention a monitor that stows into a monitor-enclosing shroud which, in turn, stows into a wall-forming panel by recessing into a cavity and providing for the rotation of the shroud on a straight axle which acts as a hinge, allowing the shroud to pivot out from the wall-forming panel yet remaining attached thereto.

Thus, the device of the present invention provides for a lightweight, compact, wall-forming panel for insertion into the interior of an aircraft. The panel comprises a frame having a cavity therein and a first shroud dimensioned to fit within the frame, the shroud articulable on an axle so as to move between a closed position in which the shroud is folded into the frame, with the back side of the shroud being flush with the outer surface of the frame, and an open position for viewing the monitor, by articulating along a straight axle. A latch means provides for positively retaining the shroud-enclosed monitor in the closed position or the opened position.

In addition, the panel of the present invention provides for a motor-driven means for moving the shroud between an open and a closed position.

The device of the present invention also provides for a clutch between the output drive of the electric motor and drive shaft of the axle.

The device of the present invention additionally provides for a means to adjustably mount the shroud to the axle.

The device of the present invention additionally provides for a switching means to operate the electric motor wherein limit switches disengage the electric motor and reverse the direction of the electric motor when the shroud reaches either of the closed or the opened position.

The device of the present invention additionally provides for an electronically-powered latch means having a cam, the cam for engaging and disengaging the axle by an electronically-powered cam release mechanism.

The device of the present invention additionally provides for a panel having a cavity large enough to incorporate two shrouds, each with identical latch assembly, axle and related assemblies.

The device of the present invention has many other objects, as described in the specifications and claims as follows:

SUMMARY OF THE INVENTION

A wall-forming panel for insertion into the interior of an aircraft, the panel having a frame with an outer surface defining a cavity. At least one shroud is dimensioned to fit within the cavity and is movable on an axle between an opened position and a closed position, the closed position substantially enclosing the shroud within the walls of the frame. A latch means positively but releasably retains the shroud in a closed or an opened position. The latch means is comprised of a cam and a cam release mechanism. The shroud is dimensioned to receive a monitor, such as a small television screen, therein, and is powered by an electric motor drive.

BRIEF DESCRIPTION OF THE DRAWINGS

FIG. 1 is a front elevational view of the panel.

FIG. 2 is a cut-away side view of the panel.

FIGS. 5, 6, and 7 are front, side, and top cross-sectional elevational views of the shroud.

FIG. 8 is a cut-away elevational view of shroud rotation mechanism.

FIG. 9 is a detail view of adjustable interconnect block apart from shroud rotation mechanism.

FIGS. 12 and 13 illustrate in top and side elevational views the cam assisting latch assembly showing solenoid-operated cam unlock means.

FIG. 14 shows in elevational view the cam removed from latch mechanism.

FIG. 15 shows in elevational view the detail of cam unlock means removed from latch mechanism.

DETAILED DESCRIPTION OF THE PREFERRED EMBODIMENT

Figure 4:
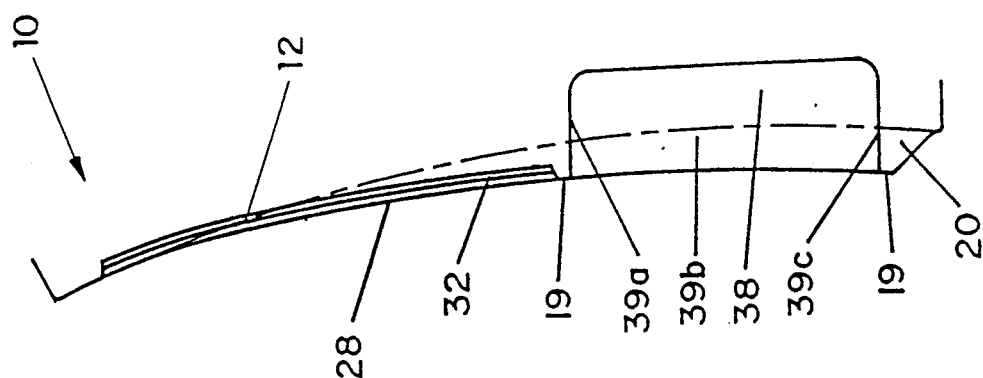
FIG. 4 is a side elevational view through FIG. 3.

FIGS. 1, 2, 3, and 4 all illustrate the use and details of panel (10) of the present invention. More specifically, FIGS. 1 and 2 illustrate panel (10) having frame (12) with frame outer surface (14) exposed to the interior of the aircraft and frame inner surface (16) facing the exterior of the aircraft. Frame (12) is preferably made of fiberglass or molded material such as acrylonitrile, butadiene, or styrene. Frame (12) therefore is preferably a single piece, rigid and curved in profile to conform to the cylindrical fuselage shape of the aircraft interior walls, as is further appreciated by viewing FIG. 2. Frame outer surface (14) has outer surface side walls (18) and outer surface bottom wall (20), as well as uniform (planar) top surface (19) with a gentle curve (top to bottom) as illustrated in profile in FIG. 2. As can be seen in FIGS. 1 and 2, there is no frame outer surface top wall as such, but instead a frame top edge (22) for flush mounting to the interior surface of the aircraft, for example, to panels adjacent to panel (10) such as the windows illustrated in phantom lines. Frame top edge (22) has lip (24) projecting generally perpendicularly inward therefrom for inserting into conventional aircraft panel mounting members (not shown).

Frame (12) has side edges (24) and bottom edge (26) for flush mounting with adjacent aircraft window panels. Thus, frame (12) contacts existing adjacent panels of the aircraft interior along frame top edge (22), side edge (24), and bottom edge (26) in flush relation with the adjacent aircraft interior panels. This is important for aesthetic purposes. Moreover, as can be seen in FIGS. 1 and 2, the profile of frame (12) is thin along frame top edge (22) and thickens as the panel curves downward and outward to frame outer surface bottom wall (20).

Figure 3:
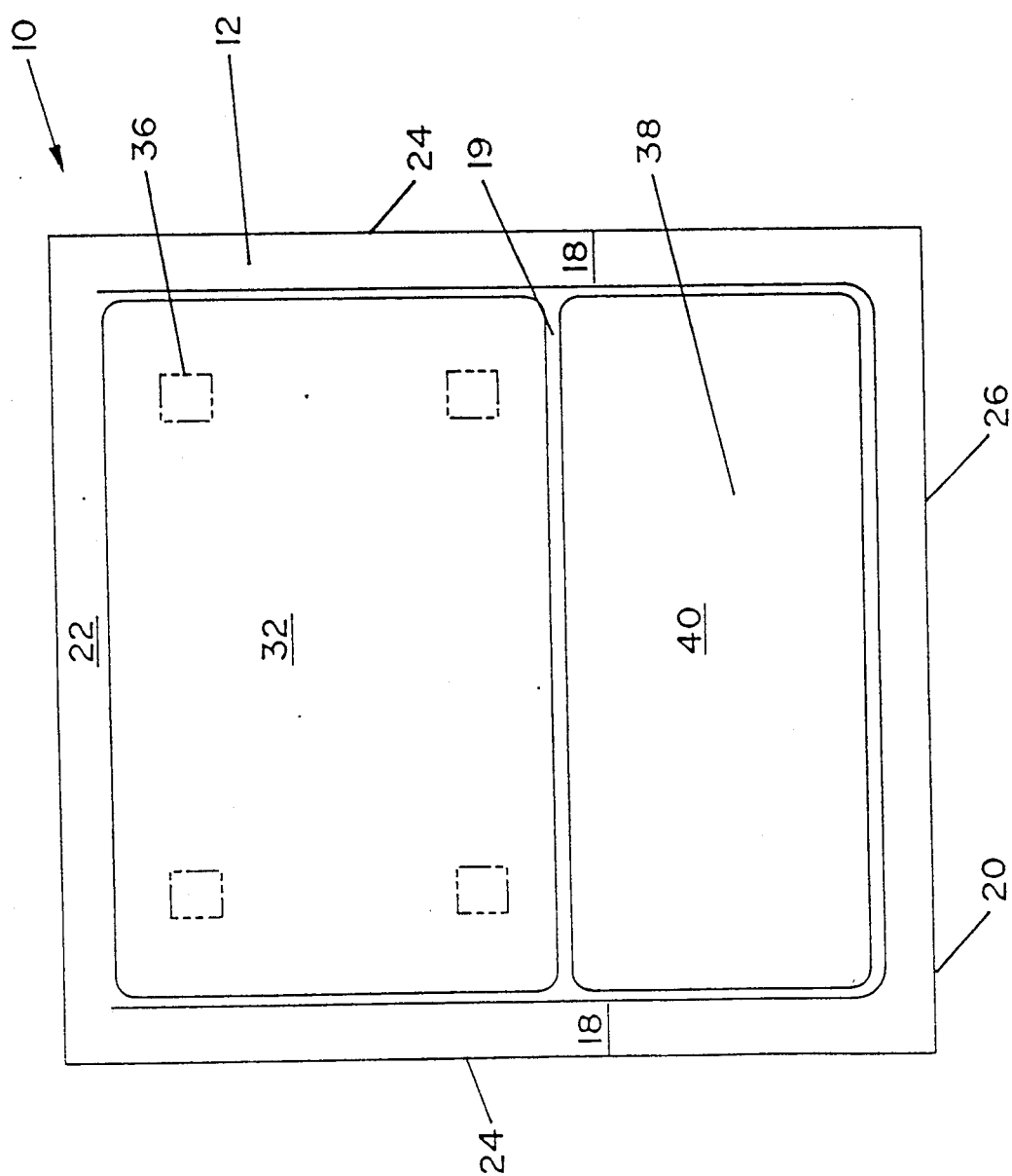
FIG. 3 is a front elevational view with insert removed from upper cavity and shrouds removed from lower cavity.

Frame outer surface (14) (FIG. 2) is shaped to define a shallow upper cavity for receiving a fabric insert removably attached to upper cavity floor (32) (FIGS. 3 and 4). Insert (30) (FIG. 1) is preferably made of a flexible, foam-backed sheet so as to conform with the curvature of frame (12) (as seen in FIG. 2) and preferably has a fabric cover (34) such as leather or the like. Insert (30) is removably attached to upper cavity floor (32) of frame (12) by use of retainment means (36) such as Velcro ® fasteners. Frame (12) of panel (10) is dimensioned to have (FIG. 4) walls (39a) (upper), (39b) (side), and (39c) (lower), defining lower cavity (38). Note that upper wall (39a) is slightly shorter than lower wall (39c) so as to maintain the curved profile of panel (10). Note further that kill switches (27) (function to be described in more detail below) are located along or near the top edge of upper cavity floor (32) and hidden by insert (30). Lower cavity (38) (FIGS. 3 and 4) is deeper than upper cavity (28) and has floor (40) thereon. As can be seen in FIGS. 2 and 4, lower cavity (38) is dimensioned to receive shroud (42) therein, shroud (42) being preferably made of molded fiberglass and dimensioned to enclose a generally rectangular monitor cavity (44) therein. As can be seen in FIG. 1, lower cavity (38) may be dimensioned for receipt of two shrouds (42), each designed to carry a monitor therein and to fit edge-to-edge as illustrated in FIG. 1. Shrouds (42) will be partially covered, at shroud cover (46), with material similar to that used on insert (30); thus shroud covers may be made of flexible plastic or the like and covered with the same or similar material to that used for insert cover (34). Likewise, retainment means (36) are used to retain shroud covers (46) to shrouds (42). The use of insert cover (34) and shroud covers (46) results in a pleasing exterior appearance to panel (10), while allowing access to the parts of the device located therebeneath. Note also that frame (12) has, located along the lower edge of upper cavity floor (32), access port (35) which allows a metal wire, such as the straight section of a paper clip, to be inserted therethrough to provide for a manual disengage to the latch mechanism as more specifically set forth below.

Figure 5B:
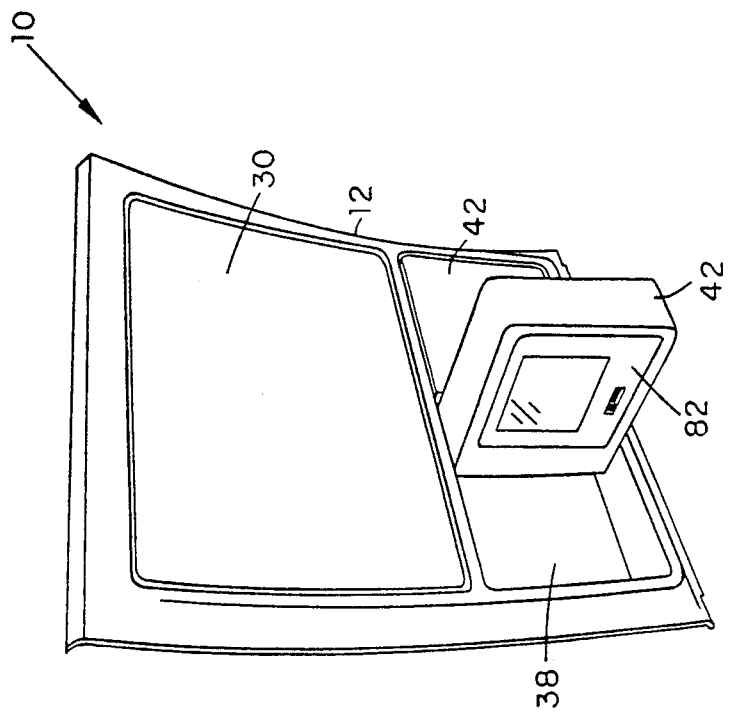
FIGS. 5a and 5b illustrate views of the monitor in the closed (5a) and open (5b) positions.
Figure 5A:
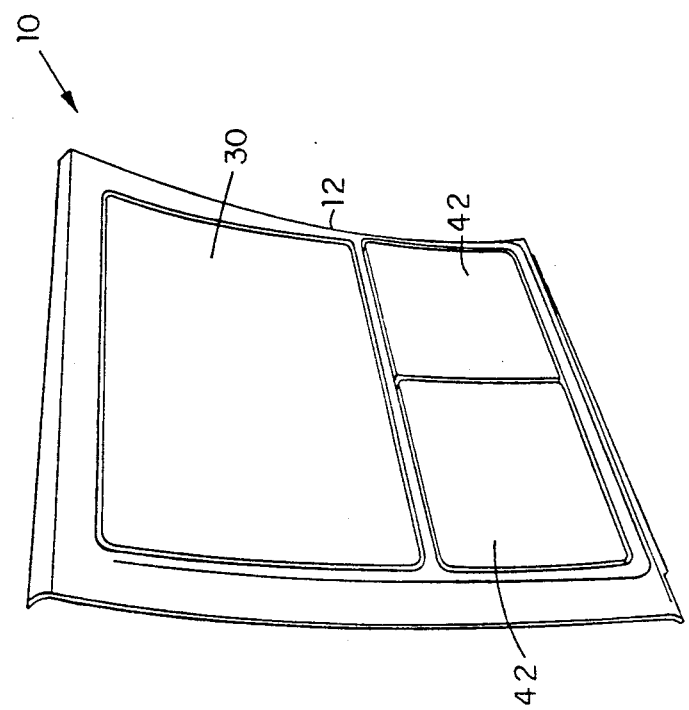

FIGS. 5, 6, and 7 illustrate additional views of shroud (42). More specifically, shroud (42) has walls defining monitor cavity (44), monitor cavity (44) having floor (48), top and bottom inner side walls (50) and (52), curved outer surface (54) whose curvature is designed to be coincident with the profile as illustrated in FIG. 2 of frame (12). Near inner side wall (54a) and far inner side wall (56) complete the walls defining monitor cavity (44) and can be seen to be generally rectangular. These walls meet perimeter (58) which is comprised of lower perimeter surface (60), far perimeter surface (62), upper perimeter surface (64), and near perimeter surface (66), the perimeter (58) therefore having a flat surface as seen in the view illustrated in FIG. 7. However, near perimeter surface (66) can be seen to be wider than far perimeter surface (62), thereby positioning monitor cavity (and therefore the monitor) further outboard of pivot point as more clearly seen in FIG. 1. Perimeter (58) meets outer side walls (68) along edges (70). Edges (70) can be seen to be curved in profile, primarily for aesthetic purposes. Outer side walls (68) are comprised of far outer side wall (72), top outer side wall (74), near outer side wall (76), and bottom outer side wall (78), the side walls meeting at curved corners (80) to produce a pleasing, tapering, generally rectangular shroud (42).

FIG. 7 illustrates how monitor (82) (phantom lines) fits within monitor cavity (44) in a non-flush relation so as to be canted slightly outward to assist the seated passenger in viewing the monitor screen straight on. Thus, near inner side walls (54a) may be slightly longer than far inner side wall (56) to allow monitor (82) to cant several degrees outward from the panel, yet still provide a flush surface between monitor (82), near perimeter surface (66), and far perimeter surface (62).

FIG. 8 illustrates two shrouds (42) each located in lower cavity (38) and articulating on axles (84). Cam assembly (86) helps to positively and releasably retain each shroud (42) in a closed position wherein shroud cover (46) is flush with insert (30) and the top surface of frame (12). That is, in a closed position shroud (42) is completely enclosed within lower cavity (38). For viewing monitor (82), cam assembly (86) positively and releasably retains monitor (82) enclosed in shroud (42) in a position approximately 95° from the closed position, the shroud (42) being in an open position to allow the passenger to view monitor (82) (See FIGS. 5a and 5b for the closed and open positions respectively). In any case, movement between the closed and the opened position is accomplished by rotation of shroud (42) on axle (84). More specifically, shroud (42) is retained to shroud frame (86a), the shroud frame having a horizontal arm (88) and a vertical arm (90) for mounting on both the inner surfaces of top inner side wall (50) (FIG. 6) and bottom inner side wall (52) (horizontal arms (88)) and the inner surfaces of inner side wall (54a) (vertical arms (90)). Mounting of shroud (42) to axle (84) is accomplished by attaching horizontal arms (88) and vertical arms (90) (two per shroud, as illustrated in FIG. 8)

together at joint (92) such that both horizontal arm (88) and vertical arm (90) are attached to one another as well as being attached to shroud (42). Attachment arm (98) (FIG. 9) of adjustable interconnect block (94) connects shroud frame (86a) rigidly to axle (84), and is adjustable as set forth in FIG. 9. More specifically, adjustable interconnect block (94) has body (100) which is generally L-shaped having attachment arm (98) extending therefrom for attaching to vertical arm (90) of shroud frame (86a). Body (100) of adjustable interconnect block (94) has axle bore (96) therein for enclosing a portion of axle (84). Slot (102) provides some flexing to that portion of body (100) that is removed from attachment arm (98). More specifically, threaded bore (104) is designed to receive an adjusting screw (not shown) which, when rotated into threaded bore (104), will provide compression to close slot (102) slightly and provide a snug, tight fit with axle bore (96) compressed on axle (84). Thus, adjustable interconnect block (94) provides for adjustably positioning shroud (42) so it is flushly mounted within lower cavity (38) as illustrated in FIG. 1. Adjustment screws (106) can be seen in FIG. 8.

Thus, the device of the present invention provides for a straight pivot-hinge with shroud (42) rotating on axle (84) between an opened and a closed position, and providing a cam assembly (86) to positively retain shroud (42) in either the opened or closed position.

Figure 11:
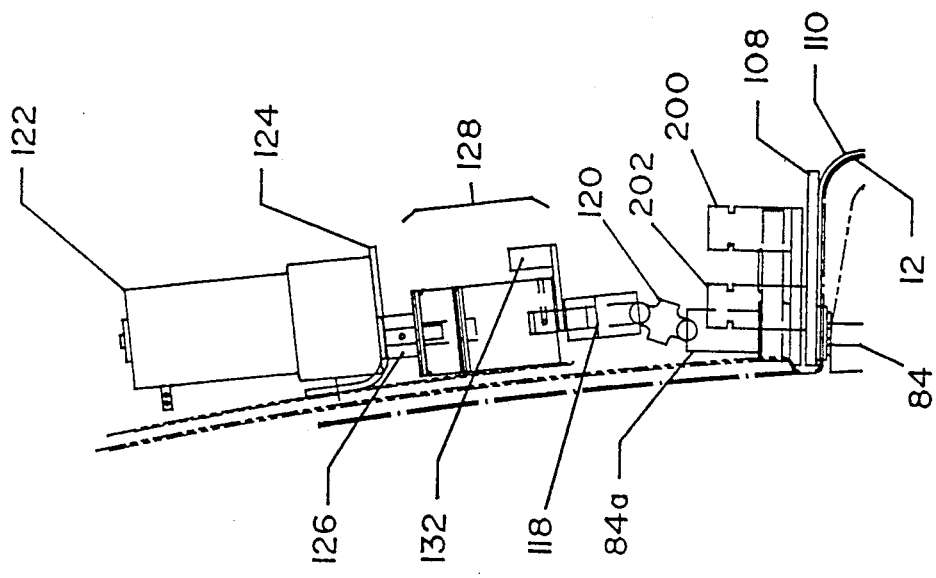
FIGS. 10 and 11 illustrate in top and side elevational views the electronic drive means of the present invention with drive shaft engaging armature output shaft through clutch and illustrating drive shaft offset with axle.
Figure 10:
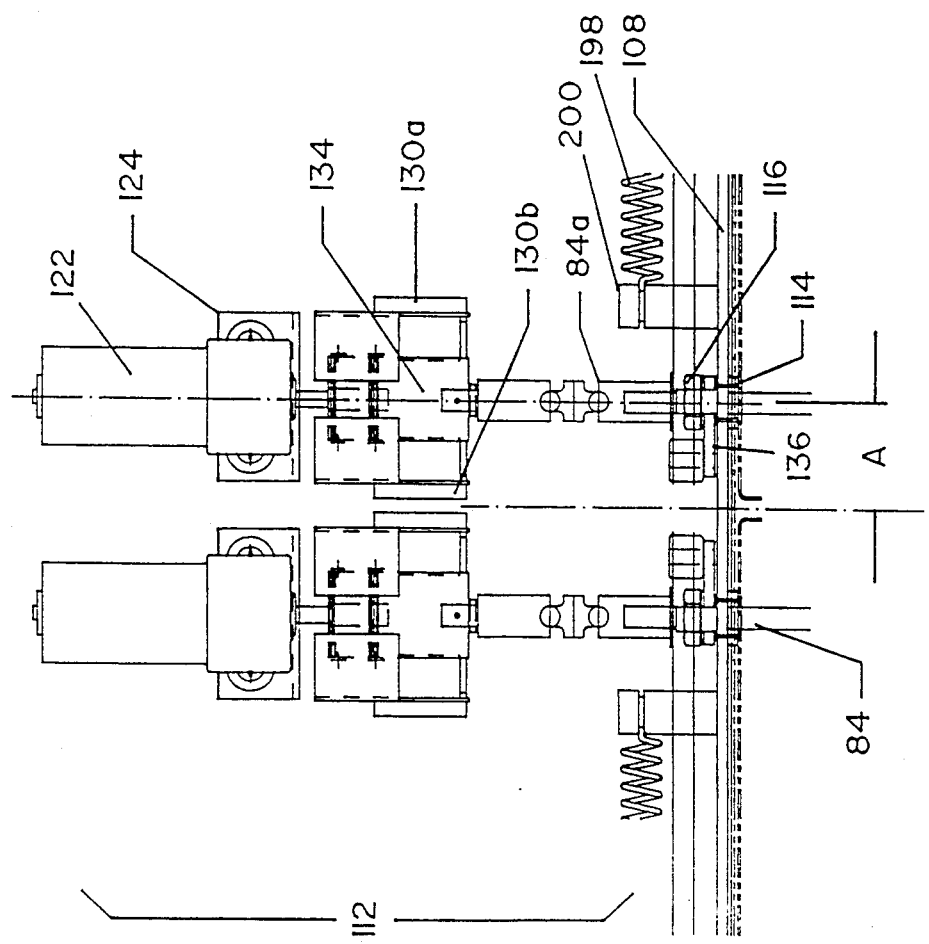

Cam assembly (86) and axle (84) are mounted on and through, respectively, mounting plate (108) as illustrated in FIGS. 8, 10, and 11. Between mounting plate (108) and frame (12) is T-brace (110) as illustrated in FIGS. 9, 10, and 11. T-brace (110) and mounting plate (108) both provide rigidity for mounting the components of the device of the present invention to frame (12). In particular, mounting plate (108) provides a fixed, rigid, and planar surface to act as a bushing surface for axle (84) and for mounting cam assembly (86) to panel (10). T-brace (110) has arms which extend along the upper inside surface of walls defining lower cavity (38) in a T-shape as illustrated in FIG. 8, with the leg of the T extending downward across the center inside surface of walls defining lower cavity (38) and curving around inside of walls (39c). T-brace (110) provides a means for mounting lower end of axle (84) to maintain proper alignment with upper end of axle (84), the upper end being the end at which cam assisting assembly (86) engages axle (84) as set forth more fully below. In other words, T-brace (110) articulates with both ends of axle (84).

FIGS. 10 and 11 illustrate more specifically how motor drive assembly (112) engages axle (84) to rotate shroud (42) between an opened and a closed position. More specifically. FIGS. 10 and 11 illustrate axle (84) rotating about bushing (114) through walls of frame (12), through T-brace (110) and through mounting plate (108). Axle retaining jamb nuts (116) retain each end of axle (84). Drive shaft (118) is coupled to removed end (exposed beyond jamb nut (116)) of axle (84a) through universal joint (120). Electric motor (122), which powers shroud (42) is mounted to the inside surface of frame (12) beneath upper cavity floor (32) which, as set forth in more detail earlier, is curved. As a result of the requirement of having a "low profile," curved panel, it is difficult to have direct alignment between drive shaft (118) of electric motor (122) and axle (84), thus the need for a universal joint (120) or other means of conveying the rotational output of drive shaft (118) in a non-linear fashion to axle (84).

Electric motor (122) is attached by motor mounting bracket (124) to the inside surface of frame (12) or to a mounting plate (not shown). Output armature shaft (126) of electric motor (122) is attached to a microswitch/clutch assembly (128). Microswitch/clutch assembly (128) allows disengagement of drive shaft (118) from output armature shaft (126) should shroud (42) in moving between an opened and a closed position, be held or otherwise retained, i.e., one getting one's fingers pinched, while electric motor (122) continues to run. This prevents someone having their fingers inadvertently jammed as shroud (42) attempts to move to its closed position within lower cavity (38). Microswitch/clutch assembly (128) has microswitches (130a) and (130b) mounted thereto for engagement with switch activation arm (132). Thus, when electric motor (122) is activated through a remotely located manually operated switch (not shown), switch activation arm (132) will rotate with drive shaft (118) on which switch activation arm (132) is rigidly mounted until it strikes either switch (130a) or switch (130b) (depending upon whether shroud (42) is moving from an opened to a closed position or from a closed to an opened position). In either case, upon switch activation arm (132) striking the microswitch, electric motor (122) will be simultaneously deenergized and the direction of the rotational motion of output armature (126) will be reversed, thereby resetting the remotely-located, manually-operated on-off switch for another activation, and allowing the shroud (42) to move in an opposite direction the next time manually-operated remotely-located switch (not shown) is engaged.

The use of kill switches (37) provides for failure of the microswitch assembly to operate properly or for any failure of the system that causes the motors to continue to run after the shroud has completed its travel, the system being overridden by the kill switch (37) allowing the motors may be deenergized by the passenger activating the kill switches (37).

FIGS. 10 and 11 also illustrate clutch assembly (134) which clutchingly engages and disengages drive shaft (118). Clutch assembly (134) of microswitch/clutch assembly (128) is of the friction type and may be purchased through Winfred Berg as Model No. JJ-27.

The table following as Table 1 illustrates some of the electrical components of the present invention, their sources and specifications in more detail. Tables 2 and 3 illustrate some important dimensions.

TABLE 1

| ELECTRIC (Ratings) | PART NO. | PART NAME | VENDOR |
|---|---|---|---|
| 10 AMP | V3-1001 | Microswitch (130a) & (130b) | Honeywell |
| 28 VDC–48 VDC | 6M8712F412 | Motor (122) | Pittman |
| 13.2 VDC-28.0 VDC | 174412-028 | Solenoid (192) | Ledex |
| 6AE12SVAC 125 VAC | MPG106D | Switch (37) | Alco |
| 3 VDC-28 VDC | A1-LCDX | Electronic Filtering Relay Box | Audio International |

TABLE 1-continued

| ELECTRIC (Ratings) | PART NO. | PART NAME | VENDOR |
|---|---|---|---|
| N/A | JJ-27 | Clutch (134) | Winfred Berg |

TABLE 2

| DIM A = | 1.28 DIM which positions hinge point at proper clearance location |
|---|---|

TABLE 3

| Monitor Specifications | |
|---|---|
| Height = | 5.91 |
| Width = | 5.59 |
| Depth = | 1.85 |

Turning now to FIGS. 12 and 13, details of cam assisting assembly (86) may be seen. More specifically, FIGS. 12 and 13 illustrate how jamb nut (114) retains axle (84) which has axle lever arm (136) rigidly mounted thereto to rotate integral with axle (84) under the impetus of an energized electric motor (122). As can be seen more specifically in FIG. 12, axle lever arm (136) has a removed end having stub (138) on which cam follower (roller) (140) is attached. Cam follower or roller (140) of axle lever arm (136) engages lobed end (142) of cam (144) at the two positions illustrated in FIG. 12, the two positions representing a closed and an opened (dashed lines) position of shroud (42). The angle enclosed between the opened and the closed position of shroud (42) is adjustable by adjusting eccentrically shaped adjustable cam follower stops (146) which are lobed and retained by screws (148) to mounting plate (108).

FIGS. 12 and 13 also provide additional details on the manner in which cam (144) provides positive retainment for shroud (42) in either the opened or the closed position. More specifically, cam (144) has lobed end (142), cam pivot arm (150) and cam body (152). Cam pivot bolt hole (154) is located on the removed end of cam pivot arm (150). Also projecting from cam body (152) is bias means mounting arm (156) with bias means mounting stub (158) and engagement collar (160) projecting vertically therefrom.

Turning now to lobed end (142) of cam body (152), it can be seen in FIG. 14 that lobed end (142) has boss (162) projecting therefrom, boss (162) having first locking lip (164) and second locking lip (166) between which is guide surface (168). Extending distally from boss (162) is lobed end finger (170).

Turning back now to FIG. 12, it can be seen that cam unlock means (172) is generally T-shaped, having cam unlock arm (174) with cam engagement stub (176) thereon. Solenoid engagement arm (178) with solenoid engagement stub (180) thereon extends generally perpendicularly from pivot arm (182) of cam unlock means (172). Details of cam unlock means (172) can be further appreciated with reference to FIG. 15 which further illustrates cam unlock pivot bolt hole (188) which aligns with cam pivot bolt hole (154) when rotatably mounted by pin (190) or other fastener means to mounting plate (108) as seen in FIG. 12. FIG. 15 also illustrates solenoid engagement hole (186) for engagement of solenoid (192) with cam unlock means (172). Finally, it can be seen that cam unlock arm (174) has cam engagement stub (176) mounted thereon, and which has, in turn, engagement collar (184) thereon.

Turning now back to FIG. 12, it is seen how solenoid (192) is mounted to mounting plate (108) by means of solenoid mounting bracket (194). Solenoid (192) has plunger (196) which is engaged and disengaged as solenoid (192) is remotely activated (energized).

With the details of the structure of cam assembly (86) of the present invention clear, its operation may be more apparent. More specifically, with reference to FIG. 12, it can be seen that energization of solenoid (192) along with the retraction of plunger (196) which will accompany such energization, will allow cam unlock means (172) to pivot about pin retained cam unlock pivot bolt hole (188) while cam engagement stub (176) acts to urge body (152) of cam (144) against bias means (198). As can be seen, bias means (198), such as a coil spring, is located fixedly to mounting plate (108) through bias means mounting stub (200) and mounted at a removed end of bias means (198) to bias means mounting stub (202). Stub (202) is integral with bias means mounting arm (156) which normally biases cam (144) in an anticlockwise position as viewed in FIG. 12. Adjustable cam follower stops (146) provide a positive stop (acting through engagement with axle lever arm (136)) limiting cam movement in the anticlockwise direction.

Thus, energization of solenoid (192) will provide for a momentary clockwise rotation of cam lobed end (142) as cam (144) articulates about cam pivot bolt hole (154). Simultaneously with the engagement of solenoid (192) and the release of cam lobed end (142) from a locked position, is energization of electric motor (122) which provides for rotation of axle lever arm (136) between the positions illustrated by solid and dashed lines in FIG. 12. It is to be understood that solenoid (192) need be only momentarily energized as locking lips (164) and (166) need only clear cam follower (roller) (140) after which bias means (198) will urge cam follower (roller) (140) against or towards guide surface (168). Finally, it can be seen that, in case of electrical failure of the solenoid, access port (35) will allow the insertion of a stiff wire or the like therethrough that will engage either cam body (152) or cam unlock arm (174) to physically push cam (144) off cam follower (140) to release shroud (42).

To explain the operation more specifically, let us consider the position of cam assisting assembly (86) as illustrated by the solid lines in FIG. 12. This position represents the closed position of shroud (42). The passenger engages a remotely located switch which, through a control board, simultaneously energizes solenoid (192) and electric motor (122). Solenoid (192) acting through plunger (196), cam unlock means (172), and cam lobed end (142) will release cam follower (140) from its locked position beneath first locking lip (164). Electric motor (122) continues to rotate axle (84) as cam follower (roller) (140) rides above (if solenoid has not deenergized) or along guide surface (168), all the while with bias means (198) urging cam lobed end (142) toward the guide surface (168) and the cam follower (roller) (140). However, when cam follower (roller) (140) clears second locking lip (166) of boss (162), lobed end (142) will rotate anticlockwise under the urging of bias means (198) jamming cam follower (roller) (140) against boss (162) and adjustable cam roller stop (146) (as seen in FIG. 12 as being mounted beneath bias means mounting stub (200) to mounting plate (108)). At this moment, switch activation arm (132) will be engaging either microswitch (130a) or (130b) to disengage electric motor (122).

Thus it can be seen how cam (144) provides for bias means (198) normally positively but releasably retaining axle (84) through axle lever arm (136) in a positively opened or positively closed position by providing boss (162) having first locking lip (164) and second locking lip (166) to prevent the rotation of the axle unless cam unlock means (172) is energized to disengage cam lobed end (142) from axle lever arm (136).

In addition, it can be seen in FIG. 12 how cam assembly (86) provides a means to adjust the angular opening of shroud (42) by using concentrically shaped adjustable cam follower stops (146) (two).

Figure 16:
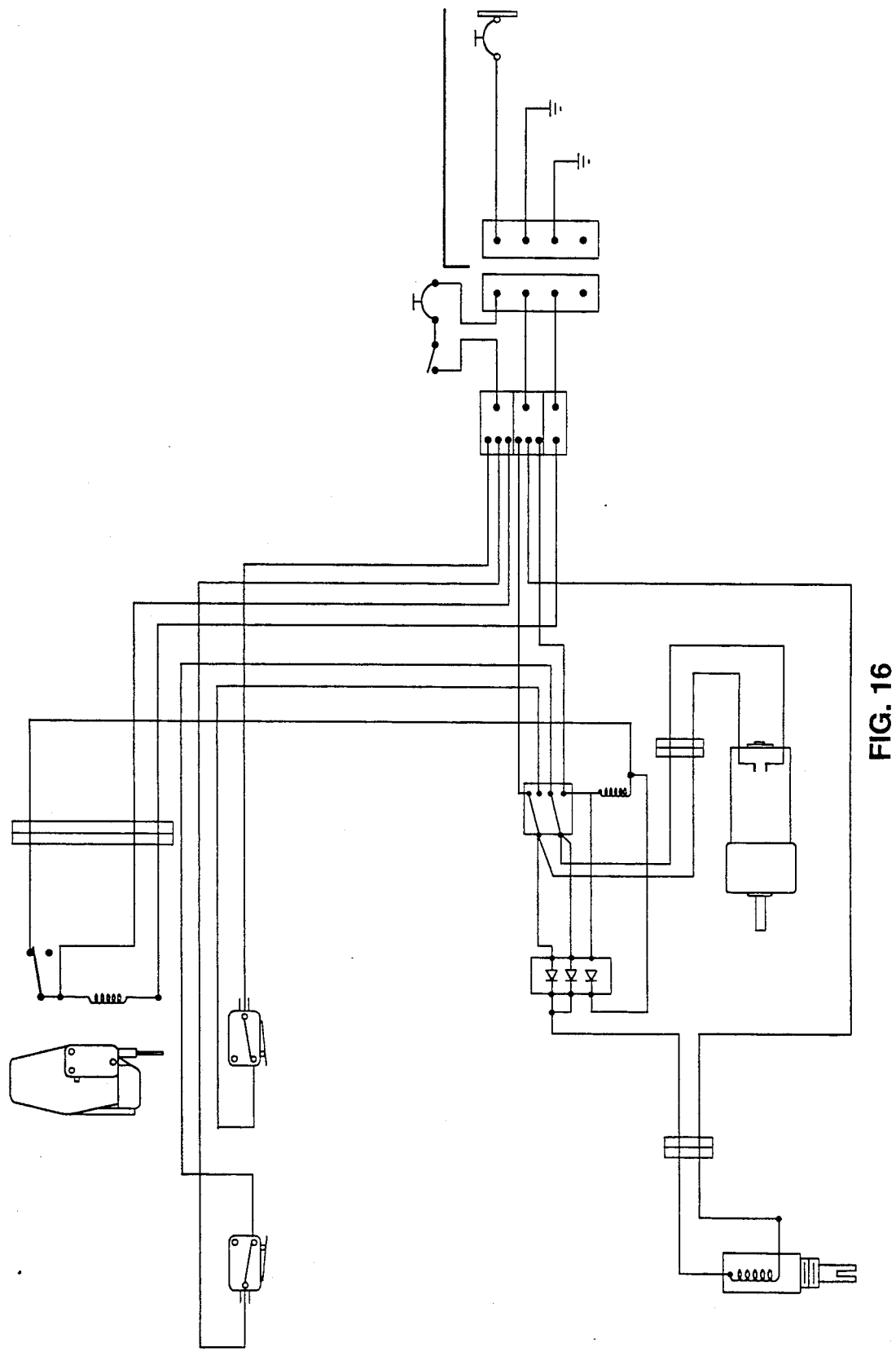
FIG. 16 is a schematic illustrating one particular circuit that may be used to distribute the electrical energy of the present invention according to the specifications set forth herein.

FIG. 16 illustrates, in schematic form, the details of one electronic circuit that will provide for the distribution of electrical energy through the system. This circuit will provide for the proper reversal of direction of the motor drive as required. However, it should be noted that Audio International provides the same function in the electronic filter/relay box, Part No. A1/LCDX.

Thus, the device of the present invention sets forth a wall-forming panel (10) for insertion into the interior of an aircraft, the panel having a frame (12) with an outer surface (14) defining a cavity. A shroud (42) is dimensioned to fit within the cavity (44) and movable on an axle (84) between an opened position and a closed position, the closed position substantially enclosing the shroud (42) within the walls of the frame (12). A latch means (86) positively but releasably retains the shroud (42) in a closed or an opened position. The latch means (86) is comprised of a cam (144) and a cam release mechanism (172). The shroud (42) is dimensioned to receive a monitor (82) such as a small television screen, therein, and is powered by an electric motor drive (122).

Terms such as "left", "right", "up", "down", "bottom", "top", "front", "back", "in", "out" and the like are applicable to the embodiment shown and described in conjunction with the drawings. These terms are merely for the purposes of description and do not necessarily apply to the position or manner in which the invention may be constructed or used.

Although the invention has been described in connection with the preferred embodiment, it is not intended to limit the invention to a particular form set forth, but on the contrary, it is intended to cover such alternatives, modifications, and equivalents as may be included within the spirit and the scope of the invention as defined by the appended claims.

I claim:

1. A wall-forming panel for inserting into the interior of an aircraft, the panel comprising:
   a frame having a top edge, side edges, and a bottom edge, said frame including an inner surface and an outer surface and defining a cavity therein;
   a first shroud dimensioned to fit within at least a portion of the cavity of said frame, movable between a closed position, the closed position for containing said first shroud substantially within the cavity and an open position, the open position for substantially removing said first shroud from the cavity, said first shroud for enclosing a first monitor therein;
   a first axle, mountable to said first shroud, for rotatably mounting said first shroud substantially within the cavity of said frame; and
   first latch means for positively retaining said first shroud in closed position when said first shroud is in the closed position and for positively retaining said first shroud when said first shroud is in said opened position, said latch means further including release means for releasing said first shroud when positively retained.

2. The wall-forming panel of claim 1 further including a motor drive for powering said first axle and for moving said first shroud between the opened and the closed position.

3. The wall-forming panel of claim 1 further including means to adjustably mount said first axle to said first shroud.

4. The wall-forming panel of claim 1 wherein said first shroud has a panel, removably mounted the rear surface thereto, said first shroud dimensioned such that the panel of said first shroud is flush with the top surface of said frame when said first shroud is in the closed position.

5. The wall-forming panel of claim 2 further comprising a clutch for connecting said motor drive to said first axle.

6. The wall-forming panel of claim 2 wherein the output shaft of said motor drive and said first axle are in a nonaligned relation, and further including a means for transmitting a rotational torque of the output shaft to said nonaligned first axle.

7. The wall-forming panel of claim 2 further including switch means for energizing, deenergizing, and reversing said motor drive at user's initiation.

8. The wall-forming panel of claim 2 wherein said latch means includes means to electrically operate the release means.

9. The wall-forming panel of claim 8 wherein the means to electrically operate the release means is a solenoid.

10. The wall-forming panel of claim 8 wherein said latch means includes a cam having a near end and a removed end, the near end pivotally mounted to said frame and the removed end having a boss thereon, the boss for engagement with said first axle to positively retain said first shroud in the opened and the closed positions.

11. The wall-forming panel of claim 10 wherein the release means includes a bracket having arms, the bracket pivotally attached to said frame and engaging the electronically operated means at a first arm and the cam at a second arm to disengage the boss of the cam from said first axle.

12. The wall-forming panel of claim 10 wherein said first axle includes a cam engagement arm integral therewith for engagement with the boss of the cam of said first latch means.

13. The wall-forming panel of claim 1 further comprising means to adjustably select the angle between the closed position of said shroud and the opened position of said shroud.

14. The wall-forming panel of claim 7 further including a control circuit operationally connected to said switch means for controlling electrical power to the switching means, said motor drive to control the energization of said motor drive.

15. The wall-forming panel of claim 2 further including a unitary brace for mounting the removed ends of said first axle thereto, said unitary brace for mounting integral to said frame.

16. The wall-forming panel of claim 2 further including:
  second shroud means dimensioned substantially identical to said first shroud means and insertable into the cavity of said frame for rotating between an opened and a closed position, the closed position for containing said second shroud substantially within the cavity and the opened position for substantially removing said second shroud from the cavity, said second shroud for enclosing a second monitor therein;
  a second axle, mountable to said second shroud, for rotatably mounting said second shroud substantially within the second cavity of said frame; and
  second latch means for positively retaining said second shroud in closed position when said second shroud is in the closed position and for positively retaining said second shroud when said second shroud is in said open position, said latch means further including release means for releasing said second shroud when positively retained.

17. The device of claim 15 further including means for manually activating the release means of said first and said second latch means.

18. The device of claim 2 further including a kill switch to deenergize said motor drive.

19. A wall-forming panel for inserting into the interior of an aircraft, the panel comprising:
  a molded frame having a top edge, side edges, and a bottom edge, said frame having a curved profile and being thicker at the bottom than at the top, said frame including an inner surface and an outer surface and walls defining a cavity therein;
  a first shroud, said first shroud being generally rectangular and dimensioned to fit within the cavity of said frame, said first shroud movable between a closed position, the closed position for enclosing said first shroud within the cavity of said frame and an opened position about 90° from the closed position, said first shroud for enclosing a first monitor therein;
  a second shroud, said second shroud being generally rectangular and dimensioned to fit within the cavity of said frame, said second shroud movable between a closed position, the closed position for enclosing said second shroud within the cavity of said frame and an opened position about 90° from the closed position, said second shroud for enclosing a second monitor therein;
  a first axle mountable to said first shroud for rotatably mounting said first shroud to said frame;
  a second axle mountable to said second shroud for rotatably mounting said second shroud to said frame;
  a first motor, nonaligned with said first axle, for powering said first axle to rotate said first shroud between the opened and the closed position;
  a second motor, nonaligned with said second axle, for powering said second axle to rotate said second shroud between the opened and the closed position;
  a first clutch for connecting said first motor to said first axle;
  a second clutch for connecting said second motor to said second axle;
  means for transmitting rotational output of said first motor to said nonaligned first axle;
  means for transmitting rotational output of said second motor to said nonaligned second axle;
  means for adjustably mounting said first shroud to said first axle;
  means for adjustably mounting said second shroud to said second axle;
  switch means for energizing said motors;
  first latch means for positively retaining said first shroud in the closed position when said first shroud is in the closed position and for retaining said first shroud in the opened position when said first shroud is in the opened position, said latch means further comprising means to release said first shroud when positively retained, said first latch means including a first cam having a near end and a removed end, the near end pivotally mounted to said frame and the removed end having a boss thereon, the boss for engagement with said first axle to positively retain said first shroud, the release means having a first arm engaging the first cam and a second arm engaging an electrically operated solenoid, the engagement of which releases the first cam which retains said first shroud;
  second latch means for positively retaining said second shroud in the closed position when said second shroud is in the closed position and for retaining said second shroud in the opened position when said second shroud is in the opened position, said latch means further comprising means to release said second shroud when positively retained, said second latch means including a first cam having a near end and a removed end, the near end pivotally mounted to said frame and the removed end having a boss thereon, the boss for engagement with said second axle to positively retain said second shroud, the release means having a first arm engaging the first cam and a second arm engaging an electrically operated solenoid, the engagement of which releases the first cam which retains said second shroud; and
  a unitary brace for mounting the removed ends of both said first axle and said second axle thereto, said unitary brace fixedly attached to said frame.

* * * * *